United States Patent [19]

Schultz

[11] Patent Number: 5,787,876
[45] Date of Patent: Aug. 4, 1998

[54] GLUE HEATER

[75] Inventor: Andrew C. Schultz, Stillwater, Minn.

[73] Assignee: Glass Service Company, Inc., St. Paul, Minn.

[21] Appl. No.: 768,853

[22] Filed: Dec. 17, 1996

[51] Int. Cl.⁶ .................................................. F24H 1/00
[52] U.S. Cl. ............................................ 126/284; 126/261
[58] Field of Search ................................ 126/284, 261

[56] References Cited

U.S. PATENT DOCUMENTS 1,013,336  1/1912  Tyden ...................................... 126/284
1,055,506  3/1913  Angebrandt, Jr. ....................... 126/284
2,661,015  12/1953  Allred et al. ............................ 126/261

OTHER PUBLICATIONS

"*B.T.B. Windshield Removal Kit*", video, produced by BTB Auto Glass Tools, date unknown.

*Primary Examiner*—Larry Jones
*Attorney, Agent, or Firm*—Merchant, Gould, Smith, Edell, Welter & Schmidt, P.A.

[57] ABSTRACT

The invention is an apparatus, method and system for heating glue in conjunction with a service vehicle by using coolant fluid from a cooling system of the service vehicle.

12 Claims, 3 Drawing Sheets

5,787,876

1

GLUE HEATER

BACKGROUND OF THE INVENTION

This invention relates generally to an apparatus, system and method for heating glue, and more particularly to an apparatus, system and method for heating glue using a service vehicle.

In the glass replacement service industry, technicians frequently travel in a service vehicle to the customer's location to replace automobile glass. The service vehicle contains all the supplies and equipment necessary to replace the automobile glass. When new glass is placed in a window, glue is used for affixing the glass edges to the frame. Before use, this glue is kept in tubes and, for best results should be heated to between 160° and 180° F. before application. In carrying out these mobile repairs, a reliable method of heating up the tubes of glue is necessary.

The prior art provided electric glue heaters which were run off the battery of the service vehicle. However, the draw on the vehicle battery frequently caused the battery to fail, leaving the service vehicle unable to start and travel to the next customer. These electric glue heaters frequently caused damage to the battery or the alternator of the service vehicle as well. A more reliable system is needed in order to ensure that the service vehicles are able to continue to function to meet their next appointment. The electric glue heaters are also expensive to manufacture.

There is therefore a need for a simpler, cheaper, and more reliable glue heater.

SUMMARY OF THE INVENTION

The present invention solves the above-described problems using heated coolant fluid present in a cooling system of the service vehicle to heat the glue tubes. The present invention provides a reservoir defining an interior chamber. The reservoir has an inlet to receive cooling fluid and an outlet to expel coolant fluid. The heater further comprises at least one recess for holding a tube of glue. Heated coolant fluid from the service vehicle will enter the reservoir through the inlet, fill the reservoir with the hot coolant fluid, so that the glue tube is heated to a proper melting temperature. The coolant fluid exits through the outlet of the reservoir and returns to the cooling system of the service vehicle.

The present invention also describes a method for heating a glue tube to be used with a service vehicle comprising the steps of providing a reservoir and at least one recess for a glue tube, connecting an inlet conduit to the inlet of the reservoir and to the cooling system of the service vehicle, connecting an outlet conduit to the outlet of the reservoir and to the cooling system, and inserting the glue tube into the recess.

The present invention also describes a system for heating glue tubes including a service vehicle having a cooling system that contains coolant fluid. A reservoir is mounted within the service vehicle, the reservoir defining an interior chamber and having at least one recess for a glue tube, an inlet conduit, and an outlet conduit.

BRIEF DESCRIPTION OF THE DRAWINGS

Referring now to the drawings in which like reference numbers represent corresponding parts throughout.

2

Figure 3:
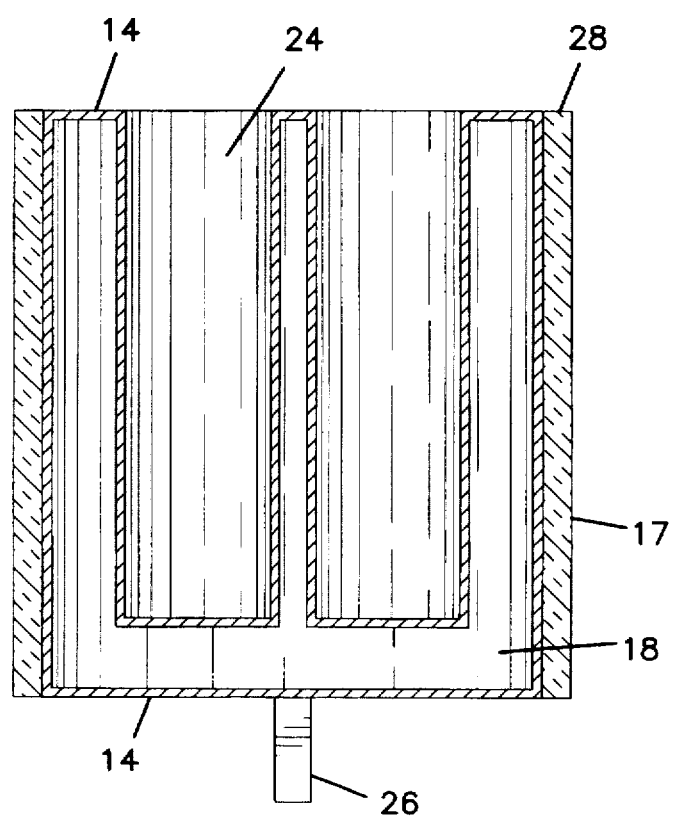

FIG. 3 illustrates a cross-sectional view of the heater for glue tubes of the present invention along line 3—3.

Figure 4:
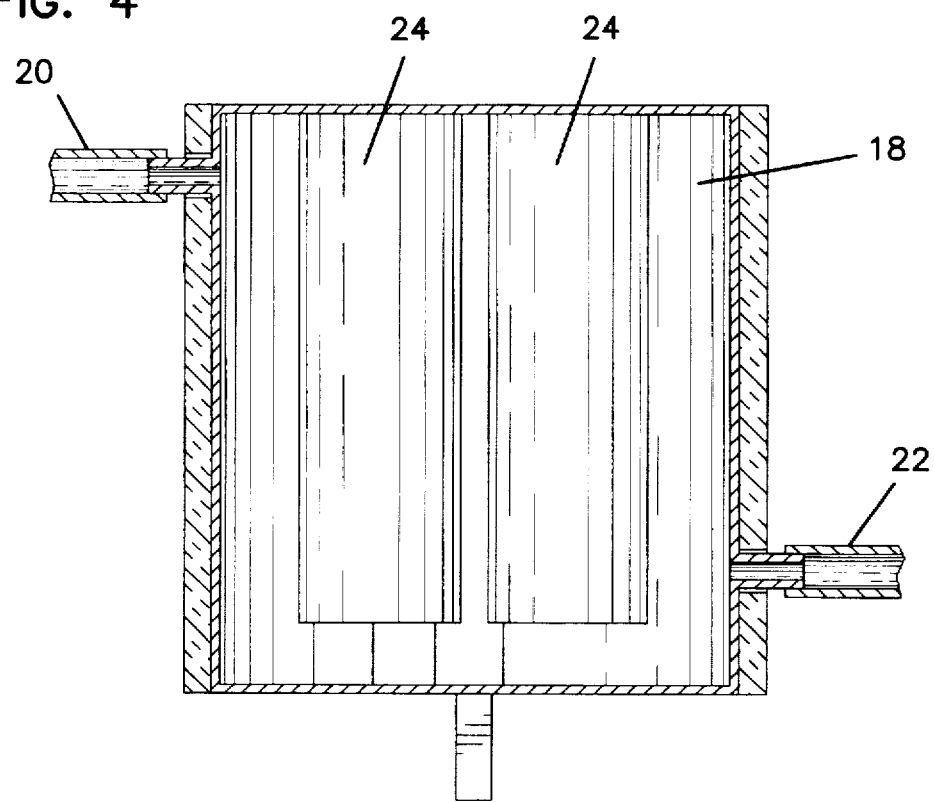

FIG. 4 illustrates another cross-sectional view of the heater for glue tubes of the present invention along line 4—4.

While the invention is amenable to various modifications and alternative forms, specifics thereof have been shown by way of example in the drawings and will be described in detail. It should be understood however that the intention is not to limit the invention to the particular embodiments described. On the contrary, the invention is to cover all modifications, equivalents, and alternatives falling within the spirit and scope of the invention as defined by the appended claims.

DETAILED DESCRIPTION OF THE DRAWINGS

The present invention is applicable to situations where glue tubes must be heated in conjunction with a vehicle. The invention has been found to be particularly advantageous in the context of the glass service industry where repairs and glass installation usually takes place at the customer's location. While the present invention is not so limited, an appreciation of various aspects of the invention is best gained through a discussion of various application examples operating in such an environment.

For best results, the glue used to replace automobile glass should be heated within a range of 160° F. to 200° F. Typical coolant fluid in the coolant system of a truck or van normally used for glass service is at the temperature of approximately 180° to 220° F. The present invention uses the coolant fluid from the service vehicle as a heat source to heat the glue to its desired temperature range.

Figure 1:
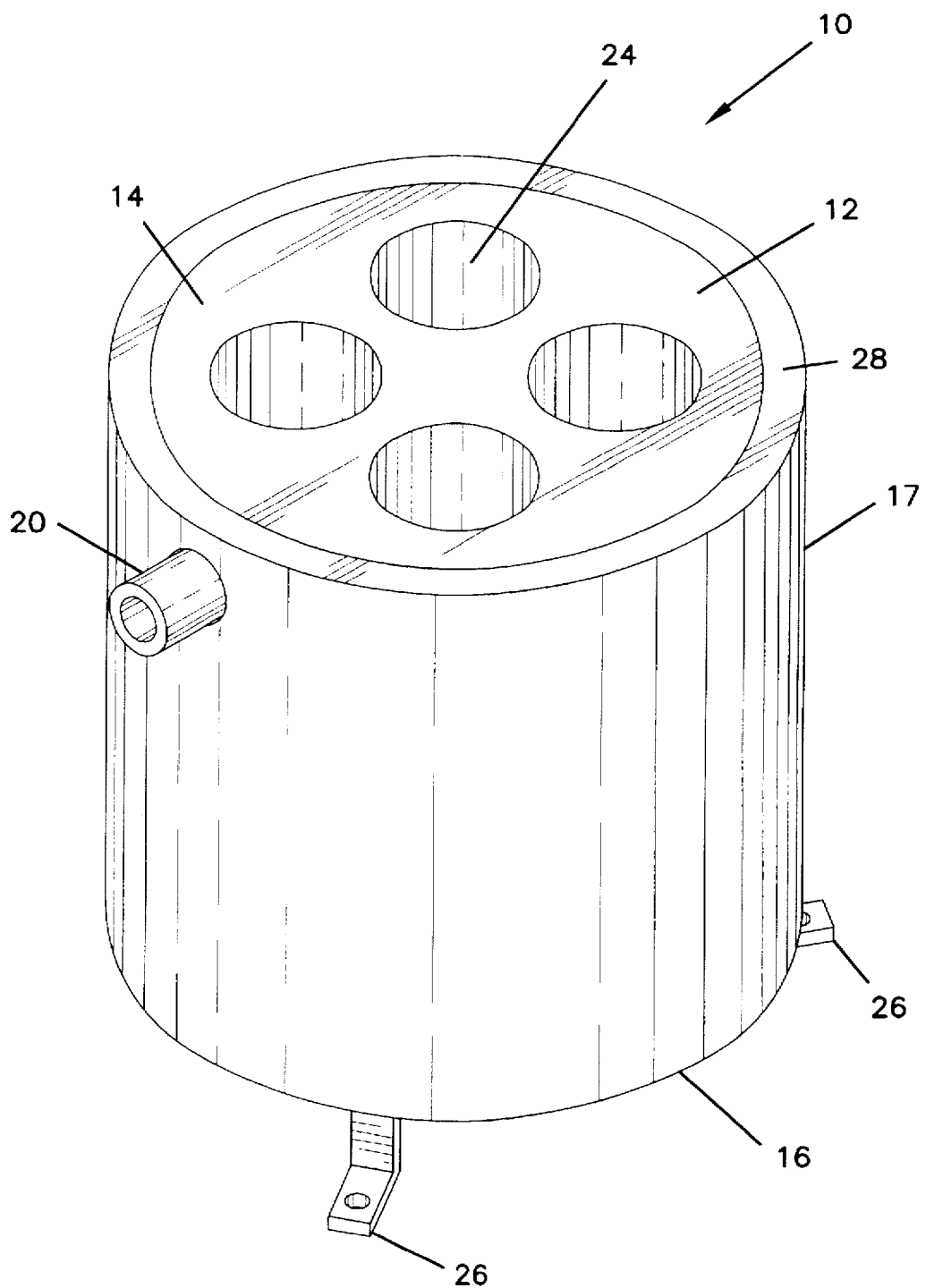
FIG. 1 illustrates a perspective view of the heater for glue tubes of the present invention.
Figure 2:
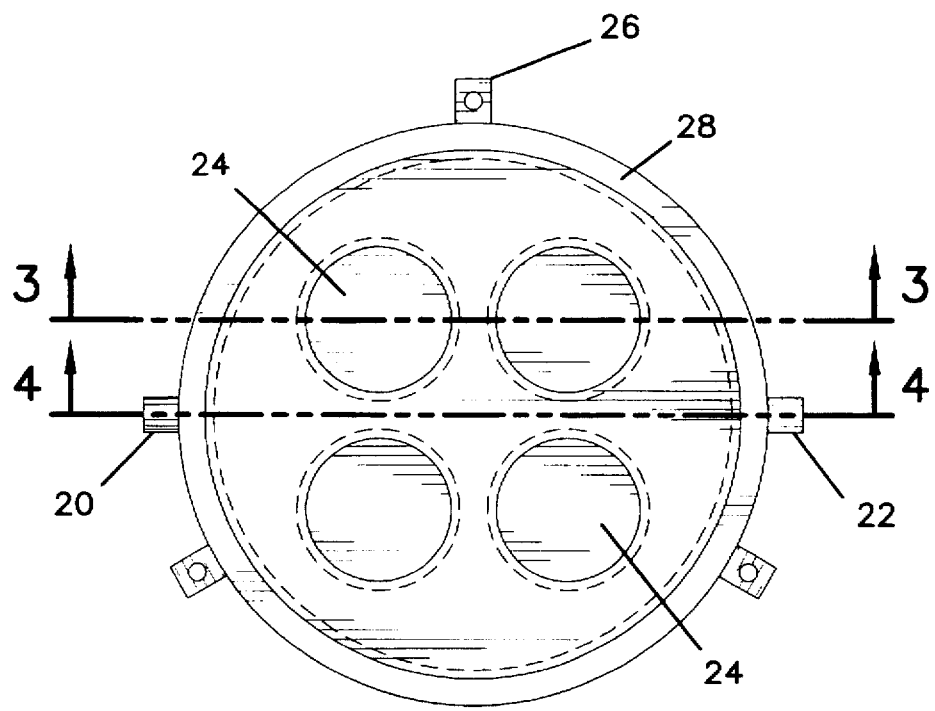
FIG. 2 illustrates a top view of the heater for glue tubes of the present invention.

Now referring to FIGS. 1–4, one embodiment of the heater for glue tubes 10 is shown from a perspective view. The reservoir 12 could be made in many different shapes which define an interior chamber. The drawings show one embodiment in a cylindrical shape where the reservoir 12 has a top surface 14, a bottom surface 16, and a continuous side wall 17. These surfaces define an interior chamber 18. An inlet 20 is provided for receiving heated coolant fluid into chamber 18. An outlet 22, shown on FIG. 2 and FIG. 3, is provided for expelling the cooling fluid from chamber 18 of reservoir 12.

FIG. 2 shows a support 26 which is attached to the bottom surface 16 of the glue heater 10. The support 26 can be affixed to a bracket (not shown) in the floor of the service vehicle. The use of the bracket and support 26 prevents the glue heater from tipping over or moving around inside the service vehicle.

In a preferred embodiment of the device, the inlet 20 is farther away from the bottom surface 16 of the reservoir 12 than the outlet 22. This arrangement improves the flow of coolant through the device and minimizes air in the cooling system.

In FIG. 3, an insulating jacket 28 on one embodiment can be seen which surrounds the reservoir 12, better retaining the heat from the heated coolant fluid. The insulating jacket 28 allows the reservoir to keep the glue tubes hot for up to an hour after the vehicle is shut off.

In one embodiment of the glue heater of the present invention, four glue tube recesses are provided. During the typical glass repair service visit, two different types of glues are needed, usually in the quantity of one tube of each type of glue. Therefore, the four-tube capacity of this embodiment is convenient for the service technician because it allows glue for two consecutive jobs to be heated. This arrangement eliminates time spent waiting for the glue to heat upon arrival at a work site.

The device of the present invention can be constructed out of many different types of material, taking into account the material's ability to hold fluid at 180° F. In one embodiment of the invention, the reservoir is made of cast iron, the conduits are made of flexible tubing, and the top and bottom surfaces are made of steel.

The dimensions of one embodiment will now be described. In one embodiment, the reservoir 12 is a eight and a quarter inch long section of cast pipe, about six inches in diameter. The top and bottom surfaces 16, 18 are made of eighth-inch plate steel. The recesses 24 are openings two inches in diameter in the top surface 14.

Now referring to FIGS. 3 and 4, as coolant fluid enters inlet 20, it fills interior chamber 18. The coolant then exits through outlet 22. When the heated coolant fluid is inside the interior chamber, it surrounds recesses 24. Recesses 24 are also visible from FIG. 1. These recesses 24 will hold the glue tubes while they are heated by the coolant fluid in the interior chamber 18.

A filling conduit and a draining conduit will be attached to the inlet 20 and outlet 22, respectively. These conduits will then be connected to the cooling system of the service vehicle, so that heated coolant runs through the filling conduit, into the inlet 20, into the reservoir, out the outlet 22, through the draining conduit, and back into the cooling system.

The present invention also describes a method for heating a glue tube to be used with a service vehicle. The first step is providing a reservoir 12 defining an interior chamber 18, to receive heated coolant fluid from a cooling system of the service vehicle, the reservoir further comprising an inlet 20 to receive coolant fluid and an outlet 22 to expel coolant fluid. The method further comprises providing at least one recess 24 for a glue tube, positioned within the reservoir 12. Then, one end of the filling conduit is connected to the inlet 20 and another end of the filling conduit is connected to the cooling system of the service vehicle. One end of the draining conduit is connected to the outlet 22 and another end is connected to the cooling system. Next, the technician allows the heated coolant from the cooling system to flow through the filling conduit into the reservoir 12, fill the reservoir 12, and flow through the draining conduit to the cooling system. Another step is inserting the glue tube into the recess 24.

It may be necessary to add additional coolant fluid to the cooling system in order to ensure that enough coolant fluid is in the system for the service vehicle.

In one embodiment, the filling and draining conduits are passed through the chassis of the vehicle in such a way to ensure that they are not pinched by any parts of the vehicle.

The present invention also describes a system for heating glue tubes comprising a service vehicle, a reservoir, at least one recess for a glue tube, a filling conduit, and a draining conduit. The service vehicle will further comprise a cooling system that contains coolant fluid.

The various embodiments described above are provided by way of illustration only and should not be construed to limit the invention. Those skilled in the art will readily recognize various modifications and changes which may be made to the present invention without strictly following the exemplary embodiments illustrated and described herein, and without departing from the true spirit and scope of the present invention which is set forth in the following claims.

We claim:

1. A system for heating glue tubes comprising:
   a service vehicle comprising a cooling system, the cooling system containing coolant fluid;
   a reservoir, defining an interior chamber, to receive heated coolant fluid from a cooling system of the service vehicle, the reservoir further comprising an inlet to receive coolant fluid and an outlet to expel coolant fluid;
   a plurality of glue tube chambers in the interior chamber;
   a filling conduit having a first and second end, where the first end is connected to the inlet of the reservoir and the second end is connected to the cooling system of the service vehicle, the filling conduit allowing heated coolant fluid to flow from the cooling system to the reservoir past the plurality of glue tube chambers; and
   a draining conduit having a first and second end, where the first end is connected to the outlet of the reservoir and the second end is connected to the cooling system of the service vehicle, the draining conduit allowing the coolant fluid to flow from the reservoir to the cooling system.

2. The system of claim 1, wherein the inlet is positioned at a higher position on the reservoir relative to the outlet, and wherein the inlet is positioned on the opposite side of the reservoir relative to the outlet thereby facilitating flow of the heated coolant from the inlet to the outlet.

3. The system of claim 1, wherein the reservoir is cylindrically shaped, having a top surface, a bottom surface and a continuous side wall.

4. The system of claim 3, wherein the plurality of glue tube chambers extend downward from the top surface.

5. The system of claim 1, further comprising four glue tube chambers.

6. The system of claim 1, further comprising a support attached to the bottom surface, wherein the support is capable of being removably secured to a bracket in the service vehicle.

7. The system of claim 1, wherein the reservoir is constructed of cast iron, and the top surface and bottom surface are constructed of steel.

8. The system of claim 1, wherein the filling conduit and the draining conduit are flexible tubing.

9. The system of claim 1, further comprising an insulating jacket surrounding the reservoir.

10. The system of claim 1, wherein each of the glue tube chambers is cylindrically shaped, having a bottom surface and a continuous side wall.

11. The system of claim 1, wherein the plurality of glue tube chambers are disposed within the reservoir and are spaced apart in relation to one another for circulating heated coolant fluid through the reservoir and around each of the plurality of glue tube chambers.

12. A method for heating glue tubes to be used with a service vehicle, comprising the steps of:
   providing a reservoir, defining an interior chamber, to receive heated coolant fluid from a cooling system of the service vehicle, the reservoir further comprising an inlet to receive coolant fluid and an outlet to expel coolant fluid;
   providing a plurality of glue tube chambers, positioned within the reservoir;
   connecting a first end of a filling conduit to the inlet and a second end of the filling conduit to a cooling system of the service vehicle;
   connecting a first end of a draining conduit to the outlet and a second end to the cooling system;

allowing the heated coolant from the cooling system to flow through the filling conduit into the reservoir, fill the reservoir, and flow through the draining conduit to the cooling system; and inserting one or more of the glue tubes into a corresponding number of the glue tube chambers.

* * * * *